INVENTOR.
SOL AISENBERG
BY Harry A. Herbert Jr
George Fine
ATTORNEYS

United States Patent Office

3,525,931
Patented Aug. 25, 1970

---

3,525,931
RADIO FREQUENCY APPARATUS FOR MEASUREMENT OF PLASMA CONDUCTIVITY
Sol Aisenberg, Natick, Mass., assignor to the United States of America as represented by the Secretary of the Air Force
Filed Oct. 25, 1968, Ser. No. 770,692
Int. Cl. G01r 33/12
U.S. Cl. 324—40                              2 Claims

---

ABSTRACT OF THE DISCLOSURE

Apparatus for the measurement of plasma conductivity of reentry plasmas utilizing a marginal oscillator where slight changes of loss in the resonant circuit coil are converted into a larger relative change in the strength of oscillation. The AC output of the oscillator is demodulated thereby limiting error resulting from the drift of components. The zero of the conductivity voltage is suppressed.

---

BACKGROUND OF THE INVENTION

This invention relates to apparatus for the measurement of plasma conductivity of reentry plasmas and more particularly the utilization of a marginal oscillator to measure the additional loss reflected into an RF tank circuit as a result of the proximity of a lossy plasma.

In the prior art there has been a number of methods of measuring plasma conductivity (these techniques have a number of limitations). The conductivity measuring method of S. C. Lin, E. L. Resler, and A. Kantrowitz (J. Appl. Physics, 26, 95 (1955)) uses a plasma moving into the magnetic influence of a field coil. The resulting induced current in the plasma is measured by a search coil. The induced plasma currents are related to the plasma conductivity. This method was designed for use with shockwave plasmas. Another method described by Fuhs and others [A. E. Fuhs, Proc. 5th Biennial Gas Dynamics Symposium, Evanston, Ill. (1963), p. 383, Northwestern Univ. Press, Evanston, Ill. 1963; also R. Betchov, A. E. Fuhs, R. X. Meyer, and A. E. Schaffer, Aerospace Eng. 21, 54, (1962)] measures a quantity related to the product of the plasma conductivity $\sigma$, and the plasma velocity, v. In this method, primary coils are excited by AC, and the plasma conductivity and velocity is deduced by means of a sensing coil.

These techniques depend on the presence of a relative motion between the plasma and an AC magnetic field. For plasmas at rest or moving relatively slowly, it is possible to measure the effect of the conductivity on the losses in an adjacent RF coil. Such a principle has been used by Olson and Lary [R. A. Olson and E. C. Lary, Rev. Sci. Instr. 33, 1350, (1962); also R. A. Olson and E. C. Lary, Conductivity Probe Measurements in Flames, AIAA Journal 1, 2513, (1963); and E. C. Lary and R. A. Olson, A Plasma Conductivity Probe, Third Symposium on Engineering Aspects of Magnetohydrodynamics (March 1962)]. Their device uses the change of average plate current with coil loss to measure the conductivity of the adjacent plasma.

The method of Lin et al. and of Fuhs et al. both require a moving plasma. The method of Olson and Lary does not require moving plasma. They use the change of average DC current of the oscillator to act as an indicator of the change of losses in the oscillator coil. Any other effect or aging that would result in a change of oscillator current cannot be differentiated from an apparent conductivity change. There is no compensation for the aging of components, for temperature changes of the circuit environment, or for changes of temperature of the probing coil.

SUMMARY OF THE INVENTION

The present invention uses a marginal oscillator concept where slight changes of loss in the resonant circuit coil are converted into a larger relative change in the strength of oscillation. There is no need for motion of the plasma. The device is designed to permit flush mounting on the vehicle surface.

Several versions of the conductivity probe have been devised. A simple laboratory probe uses a single transistor with considerable negative feedback to drive the coil. The AC output of the transistor is demodulated rather than using the average oscillator current as an indicator. In this way, drift of the components cause less error. The zero of the conductivity voltage is suppressed out using the same power supply as the oscillator so that errors due to power supply variations are reduced. This device has been approximately calibrated over about five orders of magnitude in conductivity.

In another embodiment of the conductivity probe system, the demodulated output of the oscillator has a correction voltage derived from a thermocouple at the conductivity coil added to it to compensate for temperature changes of the conductivity coil. In this way, the probe can be subjected to the higher temperatures associated with reentry plasmas, with the temperature compensation adjusted to maintain the output at zero in spite of large temperature variations of the probe. A self-adjusting feature has been added to increase the stability of the marginal oscillator. The loss in the coil is modulated slightly at a very high frequency, and the modulated output of the oscillator is compared with a preset value. Any changes of output at the modulation frequency are used to regulate the gain of the marginal oscillator. The time constant of the gain control is set to be very large so as to adjust for aging and slow drift, but at the same time, not to remove the signal due to the actual conductivity loading.

The system is designed to use semiconductor and integrated circuits to give the stability, relability, wide temperature range, light weight and small size desirable for a laboratory and flight instrument.

This device uses a marginal oscillator to measure the additional loss reflected into an RF tank circuit as a result of the proximity of a lossy plasma or other conducting material (such as metal). The change of loss in the tank circuit results in a change of the strength of oscillation. The output RF voltage is demodulated and balanced to zero to give an output zero voltage when there is no conductivity surface near the sensing coil. When the conductivity surface is added, the coil loss increases and the oscillation level decreases. As a result, the demodulated RF signal changes and this change can be used to deduce the conductivity of the test surface being measured. The skin depth of the RF field determines the probing distance below the surface that is measured. The sensitivity of the marginal oscillator is increased by operating the oscillator just on the edge of oscillation so that a small change of loss will result in a large change of oscillation level.

One of the important and unique features of the present invention is the use of large feedback to increase stability. Another is the measurement of the strength of oscillation rather than of the average current through the oscillator. Yet another is the compensation for signals due to temperature changes of the sensor coil. Still another is the regulation of the oscillator gain using chopper modulated loss in the tank circuit. Finally, there is no need for a moving plasma.

An object of this invention is to provide an apparatus to measure the electrical conductivity of adjacent plasma and to give a corresponding output voltage.

Another object of this invention is to provide an apparatus to measure the electrical conductivity of adjacent plasma by utilizing a marginal oscillator where slight changes of loss in the resonant circuit coil are converted into a larger relative change in the strength of oscillation.

Still another object of the invention is to provide an apparatus to measure the electrical conductivity of plasma by using a single transistor with considerable negative feedback to drive an oscillator coil with the AC output of the transistor being demodulated and with the zero of the conductivity voltage being suppressed out.

Yet another object of the present invention is to provide an apparatus to measure conductivity of a plasma wherein the demodulated output of an oscillator has a correction voltage derived from a thermocouple to compensate for temperature changes.

In the accompanying specification I shall described, and in the annexed drawings show, what is at present considered preferred embodiments of my present invention. It is, however, to be clearly understood that I do not wish to be limited to the exact details herein shown and described as they are for purposes of illustration only, inasmuch as changes therein may be made without the exercise of invention and within the true spirit and scope of the claims herein appended.

DESCRIPTION OF THE PREFERRED EMBODIMENTS

Figure 1:
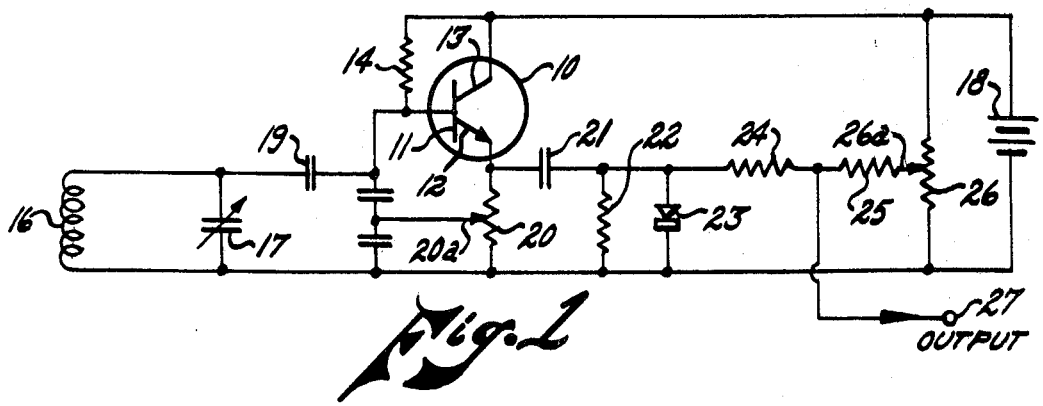
FIG. 1 shows one preferred embodiment of the apparatus to measure the electrical conductivity of plasma using a simple marginal oscillator.

Now referring in detail to FIG. 1, there is utilized a marginal oscillator including transistor 10. Transistor 10 is shown with base 11, emitter 12, and collector 13. The circuit is stable because of the large use of negative feedback for transistor 10. Voltage source 18 is connected to collector 13 and resistor 14. Resistor 14 is also connected at its other end to base 11. The RF tank circuit for the marginal oscillator is comprised of sensor coil 16 and variable capacitor 17. Sensor coil 16 is positioned adjacent to the material to be measured. Thus there is utilized a single transistor with considerable negative feedback to drive the sensor coil. Coupling capacitor 19 is connected between the RF tank circuit and base 11. There is provided a capacitor divider at base 11 being comprised of capacitor 15 and 15a which acts as a voltage step-up system to supply the necessary voltage gain. There is also provided potentiometer 20 connected to emitter 12 at its high electrical end and with its movable arm 20a connected to aforementioned capacitor divider. Potentiometer 20 serves as a level set. The output from emitter 12 is coupled by capacitor 21 to a demodulator being comprised of resistor 22 and diode 23. The demodulated output is fed to movable arm 26a of zero set potentiometer 26 by way of series resistors 24 and 25, respectively. Voltage source 18 connected to one end of potentiometer 26. Output terminal 27 is connected to resistor 24.

The marginal oscillator measures the additional loss reflected into the aforementioned RF tank circuit as a result of the proximity of a lossy plasma or other conducting material (such as metal). The change of loss in the RF tank circuit results in a change of the strength of oscillation. The output RF voltage is demodulated and balanced to zero by potentiometer 26 to give an output zero voltage at terminal 27 when there is no conductivity material adjacent to sensor coil 16, the loss of sensor coil 16 increases and the oscillation level decreases. As a result, the demodulated RF signal changes and this change is used to determine the electrical conductivity of the material being measured. The skin depth of the RF field determines the probing distance below the surface that is measured. The sensitivity of the marginal oscillator is increased by operating the oscillator just on the edge of oscillation so that a small change of loss will result in a large change of oscillation.

Figure 2:
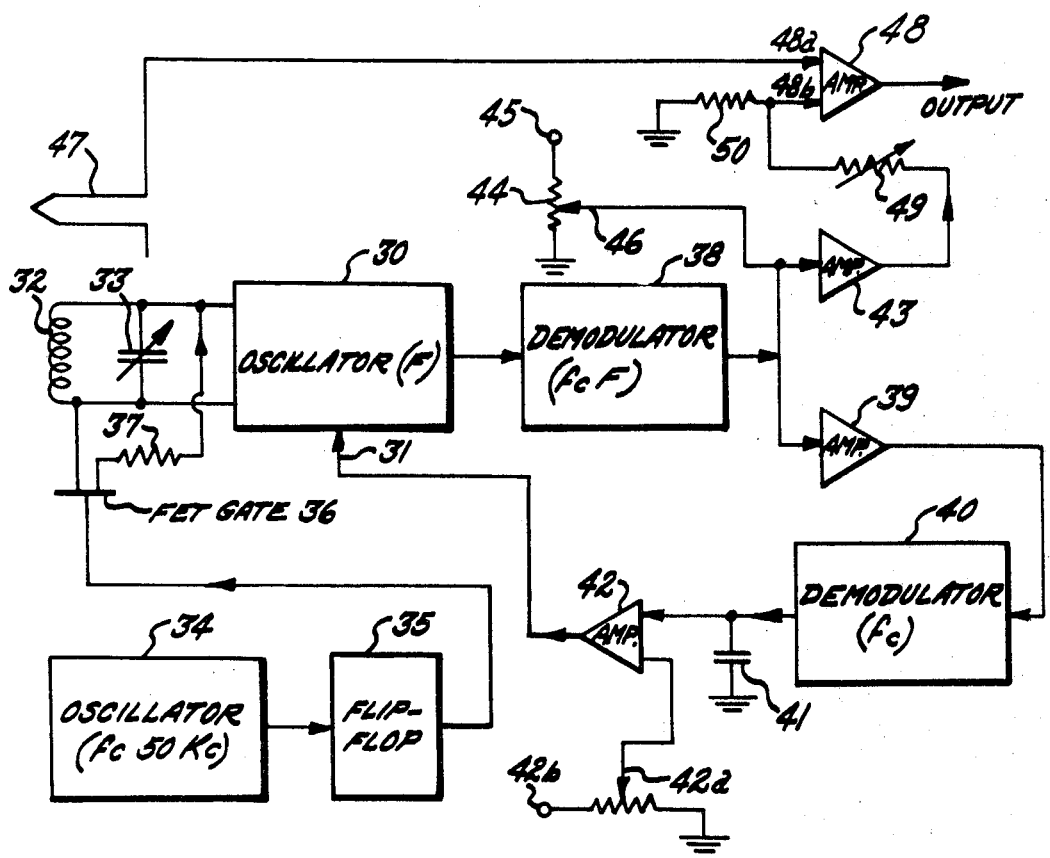
FIG. 2 shows a second preferred embodiment of the invention further including a self-adjusting system for compensation of temperature changes of sensor and of circuit.

Now referring to FIG. 2, there is shown marginal oscillator 30 with frequency, F, that is adapted to receive a gain control voltage by way of input 31. Oscillator 30 has an RF tank circuit comprised of sensor coil 32 and variable capacitor 33. An internal chopper modulated resistor loss is added to the tank circuit at a modulation frequency $f_c$, of 50 kc. by way of oscillator 34 in series with flip-flop 35, field effect transistor gate 36, and resistor 37 connected to the tank circuit. The amplitude of the carrier of oscillator 30 is thus modulated at 50 kc. The sensor coil is placed adjacent to the material being tested for conductivity and the resultant output from oscillator 30 is passed through demodulator 38 to tuned operational amplifier 39. Amplifier 39 is tuned to this modulated frequency, $f_c$, and passes the 50 kc. signal to demodulator 40. Capacitor 41 is connected to the output of demodulator 40 and ground. The output of demodulator 40 also is received by field effect transistor amplifier 42 which is adapted to be gain set by variable potentiometer 42a connected in the conventional amplifier gain setting manner such as between voltage source 42b and ground. The output of amplifier 42a is fed to input 31 of oscillator 30. There is thus provided a superlinear feedback rectifier giving a DC signal which is used to control the gain of RF oscillator 30 driving the aforementioned tank circuit. A long time constant (for example, several minutes) is used in this AGC loop to prevent the AGC from correcting for the relatively rapid changes in gain due to the conductivity being measured.

The output of demodulator 38 is also fed to low pass amplifier 43 that rejects 50 kc. Potentiometer 44 is connected between voltage source 45 and ground and movable arm 46 is adjusted as for the apparatus of FIG. 1 for zero setting purposes.

Part of the problem of measurement at high temperatures is related to the change of sensor coil conductivity due to heating of the probe. For this reason, thermocouple sensor 47 is positioned adjacent to sensor coil 32 and is used to generate a correction signal that will compensate for changes in DC output due to temperature changes only of sensor coil 32. The output of thermocouple sensor 47 is fed to input 48a of summing amplifier 48 and the output of low pass amplifier 43 is fed to input 48b by way of variable resistor 49. Input 48b is also connected to ground by resistor 50. Variable resistor 49 is varied to adjust for temperature compensation purposes. The output from amplifier 48 is a measure of the conductivity of the material being tested with the added factor of temperature compensation.

For the range of conductivity where the skin depth is large compared to the sensor coil dimensions the output signal is approximately a linear function of conductivity. For higher conductivity plasmas, the skin depth is smaller and the output is a weaker function of conductivity. In order to extend the linear conductivity range, it is necessary either to increase the diameter of the sensor coil or else reduce the operating frequency.

Thus for the embodiment shown in FIG. 2, the demodulated output of oscillator 30 has a correction voltage derived from thermocouple 47 adjacent to sensor coil 32 added to it to compensate for temperature changes of the sensor (conductivity) coil. In this way, the probe can be subjected to the higher temperatures associated with reentry plasmas, with the temperature compensation adjusted to maintain the output at zero in spite of large temperature variations of the probe. A self-adjusting feature has been added to increase the stability of the marginal oscillator. The loss in the sensor coil is modulated slightly at a very high frequency, and the modulated output of oscillator 30 is compared with a preset value. Any changes of output at the modulation frequency are used to regulate the gain of marginal oscillator 30. The time constant of the gain control is set to be very large so as to adjust for aging and slow drift, but at the same time, not to remove the signal due to actual conductivity loading.

Although the invention has been described with reference to particular embodiments, it will be understood to those skilled in the art that the invention is capable of a variety of alternative embodiments within the spirit and scope of the appended claims.

I claim:

1. Apparatus to measure the conductivity of plasma comprising an oscillator for providing a first preselected frequency signal and having an output terminal and a tank circuit including a sensor coil, said oscillator also having negative feedback to drive said sensor coil, said sensor coil being positioned adjacent and external to said plasma to be measured to permit loss to be reflected into said tank circuit, first means connected to said output terminal of said oscillator to demodulate the alternating current output of said oscillator to provide a resultant DC signal, said first demodulator means having an output terminal, means connected to the output terminal of said first demodulator means to balance the output of said demodulator means to zero in the absence of said plasma, a thermocouple also positioned adjacent to said sensor coil to provide at the output thereof an electrical correction signal to correct for the variations in the heating of said sensor coil, a first amplifier having an input and output with said input being connected to said output terminal of said demodulator means, a summing amplifier having first and second inputs and an output, said first input being connected to the output of said thermocouple, a preselected resistor connected between ground and said second input, a variable resistor connected between said output of said first amplifier and said second input of said summing amplifier, said variable resistor being adjusted ofr initial temperature compensation, said output of said summing amplifier providing a signal representative of said conductivity of said plasma.

2. Apparatus to measure the conductivity of plasma as described in claim 1 with said oscillator including an input for gain controlling said oscillator, means connected to said tank circuit to modulate said first preselected signal with a second preselected frequency signal to provide a modulated signal in addition to said first preselected frequency signal at said output terminal of said oscillator, second means having an input and output to demodulate said modulated signal, a second amplifier connected between said output terminal of said first demodulator means and said input of said second demodulator means, means to generate a preset voltage, means to compare the output of said second demodulator means to said preset voltage to provide a resultant signal, said resultant signal being received by the gain control input of said oscillator.

References Cited

UNITED STATES PATENTS

| | | | |
|---|---|---|---|
| 3,152,303 | 10/1964 | Lary et al. | 324—40 |
| 3,255,405 | 6/1966 | French | 324—34 |
| 3,444,460 | 5/1969 | Penny | 324—40 |
| 3,454,874 | 7/1969 | Young | 324—40 |

OTHER REFERENCES

Donnally et al., Simple Transistor Marginal Oscillator for Magnetic Resonance; The Review of Scientific Instruments; vol. 31, No. 9; September 1960 (pp. 977–978).

RUDOLPH V. ROLINEC, Primary Examiner

R. J. CORCORAN, Assistant Examiner

U.S. Cl. X.R.

324—34